(12) United States Patent
Cao et al.

(10) Patent No.: US 10,443,739 B2
(45) Date of Patent: Oct. 15, 2019

(54) VALVE CORE ASSEMBLY AND COMPRESSED GAS BYPASS VALVE

(71) Applicant: CONTINENTAL AUTOMOTIVE GmbH, Hannover (DE)

(72) Inventors: Xiangguang Cao, Wuhu (CN); Rosario Bonanno, Bad Soden (DE); Guangrui Sun, Wuhu (CN); Wenjuan Ye, Wuhu (CN)

(73) Assignee: Continental Automotive GmbH, Hannover (DE)

(*) Notice: Subject to any disclaimer, the term of this patent is extended or adjusted under 35 U.S.C. 154(b) by 0 days.

(21) Appl. No.: 15/557,361

(22) PCT Filed: Mar. 10, 2016

(86) PCT No.: PCT/EP2016/055127
§ 371 (c)(1),
(2) Date: Sep. 11, 2017

(87) PCT Pub. No.: WO2016/142468
PCT Pub. Date: Sep. 15, 2016

(65) Prior Publication Data
US 2018/0106381 A1    Apr. 19, 2018

(30) Foreign Application Priority Data
Mar. 12, 2015  (CN) .................... 2015 2 0146815 U

(51) Int. Cl.
*F16K 1/48* (2006.01)
*F02B 37/16* (2006.01)
*F16K 31/06* (2006.01)

(52) U.S. Cl.
CPC ................ *F16K 1/48* (2013.01); *F02B 37/16* (2013.01); *F16K 31/0655* (2013.01); *Y02T 10/144* (2013.01)

(58) Field of Classification Search
CPC ......... F16K 1/48; F16K 31/0655; F02B 37/16
See application file for complete search history.

(56) References Cited

U.S. PATENT DOCUMENTS 783,528 A  *  2/1905  Kipp ................... F16K 17/0433
                                                     137/494
1,389,056 A  *  8/1921  Lane ................... F16K 31/0655
                                                     251/129.02

(Continued)

FOREIGN PATENT DOCUMENTS

CN     203 009 035     6/2013
CN     203 189 114     9/2013

(Continued)

OTHER PUBLICATIONS

Office Action dated Sep. 10, 2018 issued in Japanese Patent Application No. 2017-548172.

*Primary Examiner* — Umashankar Venkatesan
(74) *Attorney, Agent, or Firm* — Cozen O'Connor

(57) ABSTRACT

A valve core assembly having: a guide rod; a ball bearing; a valve head provided with a first through hole at its bottom; and a fixing block provided with a second through hole at the bottom. A first end portion of said guide rod is inserted into the ball bearing, the first through hole of the valve head and the second through hole of said fixing block in sequence, and the first end portion of the guide rod is fixedly connected to the ball bearing and the second through hole of the fixing block respectively. The structure of the valve core assembly has good gas tightness, and can reduce the wear of the valve head.

19 Claims, 4 Drawing Sheets

(56) References Cited

U.S. PATENT DOCUMENTS

| | | | |
|---|---|---|---|
| 3,414,232 A | | 3/1968 | Hellman |
| 4,114,850 A | * | 9/1978 | Alamprese ............... F16K 1/48 |
| | | | 251/122 |
| 8,672,290 B2 | * | 3/2014 | Hoang ..................... F16K 3/02 |
| | | | 251/329 |
| 8,979,066 B2 | * | 3/2015 | Pfetzer ............... F16K 31/0655 |
| | | | 251/129.15 |
| 9,010,720 B2 | * | 4/2015 | Richardson ............ F16K 1/487 |
| | | | 251/321 |
| 9,145,825 B2 | * | 9/2015 | Kierat ..................... F02B 37/18 |
| 9,593,624 B2 | * | 3/2017 | Segawa ................. F02B 37/186 |
| 9,903,269 B2 | * | 2/2018 | Bonanno ................ F02B 37/16 |
| 2002/0088441 A1 | * | 7/2002 | Weldon ............. F02M 25/0836 |
| | | | 123/520 |
| 2010/0206388 A1 | * | 8/2010 | Bielab ................ F16K 31/0644 |
| | | | 137/12 |

FOREIGN PATENT DOCUMENTS

| | | |
|---|---|---|
| CN | 204 200 358 | 3/2015 |
| JP | H02 11972 | 12/1968 |
| JP | S 56-31572 | 3/1981 |
| JP | S 62-59833 U | 4/1987 |
| JP | S 63-177319 U | 11/1988 |
| JP | H 04-84025 U | 7/1992 |
| JP | H04 254084 | 9/1992 |
| JP | H 06-4349 U | 1/1994 |
| JP | H 09-4728 | 1/1997 |
| JP | 2003-161375 | 6/2003 |
| JP | 2013-256885 | 12/2013 |

\* cited by examiner

VALVE CORE ASSEMBLY AND COMPRESSED GAS BYPASS VALVE

CROSS REFERENCE TO RELATED APPLICATIONS

This is a U.S. national stage of application No. PCT/EP2016/055127, filed on Mar. 10, 2016. Priority is claimed on Chinese Application No. CN201520146815.0, filed Mar. 12, 2015, the content of which is incorporated here by reference.

BACKGROUND OF THE INVENTION

1. Field of the Invention

The present device relates to an automotive part, particularly to a valve core assembly and a compressed gas bypass valve comprising the valve core assembly.

2. Description of the Prior Art

Turbocharging technology is used to ever increasing extents in modern motor vehicles to improve energy efficiency. In a turbocharged engine, exhaust gases drive a turbine in a turbocharger to drive an air compressor, which is connected to the turbine, to compress incoming air. The compressed air reaches a throttle via an intercooler and then enters a cylinder of the engine for combustion. In practical applications, a compressed gas back-flow pipeline, which is connected in parallel to the air compressor, may be provided upstream of the compressed air intercooler, and a compressed gas bypass valve is provided in the compressed gas back-flow pipeline; when the compressed gas bypass valve is not energized, the compressed gas back-flow pipeline is in a closed state and when the compressed gas bypass valve is energized, the compressed gas back-flow pipeline is opened to enable the compressed air to flow back to an inlet end of the air compressor via the compressed gas bypass valve, so that damage to turbine blades caused by shaking due to surges can be prevented, and meanwhile, the back-flow of the compressed gas can also allow the turbine to continue rotating to reduce turbine lag during acceleration and protect the throttle.

In the existing compressed gas bypass valve, to achieve opening and closing of the valve in response to movement of a valve head, the valve head is generally directly connected to an armature in a floating manner, such as the compressed gas bypass valve design set forth in an authorized Chinese patent publication No. CN 203009035 U. Alternately a guide rod is connected to the valve head by an interference fit for transferring a guiding force. The above-mentioned guiding mode in which the valve head is moved directly by the armature has the shortcomings of higher requirements of processing features such as the shape of the armature, and increasing the processing costs; moreover, in the case that the guide rod is in a direct interference connection with the valve head, due to dimensional tolerances of the customer's valve seat and the valve head themselves, the attachment and sealing between the valve head end portion and the customer's valve seat cannot be fully guaranteed, resulting in poor sealing performances; in addition, if there is a gap between the valve head and the guide rod in the axial direction of the guide rod, the valve head would tend to wear.

SUMMARY OF THE INVENTION

An aspect of the present device is to provide a valve core assembly and a compressed gas bypass valve including the valve core assembly, which solve the problem of gas leakage between the valve head and the customer's base, and the wear of the valve head due to a relatively large axial clearance.

The present device provides a valve core assembly, comprising: a guide rod 1; a ball bearing 2; head 3. The valve head 3 has a first through hole 301 at the bottom; a valve and a fixing block 4, the fixing block 4 being of a hollow bowl-shaped structure which is provided with a second through hole 401 at the bottom.

A first end portion 101 of the guide rod 1 is inserted into the ball bearing 2, the first through hole 301 of the valve head 3 and the second through hole 401 of the fixing block 4 in sequence, and the first end portion 101 of the guide rod 1 is fixedly connected to the ball bearing 2 and the second through hole 401 of the fixing block 4 respectively.

The present device further provides a compressed gas bypass valve comprising the valve core assembly provided in the above utility model, and further comprising:

an armature 5 connected to the guide rod 1; a sleeve 8 sheathed onto the outer periphery of the armature 5; a bobbin 6 at least partially enclosing the sleeve 8; a coil 7 arranged to be wound about the bobbin 6; an upper stator 9 and a lower stator 10; an upper bearing 11 and a lower bearing 12 for guiding the guide rod 1; and an elastic component 20 for biasing the valve head 3.

Compared with the prior art, the valve core assembly and the compressed gas bypass valve of the present device have the following advantages:

the valve head has the feature of being floatable in a radial direction of the guide rod, so that a better gas tightness can be achieved between the valve head end portion and the customer's base, thereby improving the condition of gas leakage;

the valve core assembly and the compressed gas bypass valve reduce the gap between the components in the axial direction of the guide rod, thereby reducing the wear of the valve head during operation; and the present device can also enhance the connection strength between the valve head and the guide rod.

BRIEF DESCRIPTION OF THE DRAWINGS

The accompanying drawings constituting part of the present application are used to provide further understanding of the present utility model, and exemplary embodiments of the present device and the description thereof are used to explain the present utility model, but are not intended to improperly limit the present utility model. In the accompanying drawings.

DETAILED DESCRIPTION OF THE PRESENTLY PREFERRED EMBODIMENTS

The valve core assembly and the compressed gas bypass valve comprising the valve core assembly according to one aspect of the present device will be described below with reference to the accompanying drawings and embodiments. In the following description, many specific details are set forth in order to give those skilled in the art a more comprehensive understanding of the present utility model. However, it would be apparent to a person skilled in the field that the present device may be achieved without some of these specific details. In addition, it should be understood that the present device is not limited to the specific embodiments presented. Instead, it is envisaged herein that any combination of the following features and elements can be used to implement the present utility model, regardless of whether or not they are involved in different embodiments. Therefore, the following aspects, features, embodiments and advantages are merely illustrative and should not be regarded as elements or definitions of the claims, unless explicitly stated in the claims.

Figure 1:
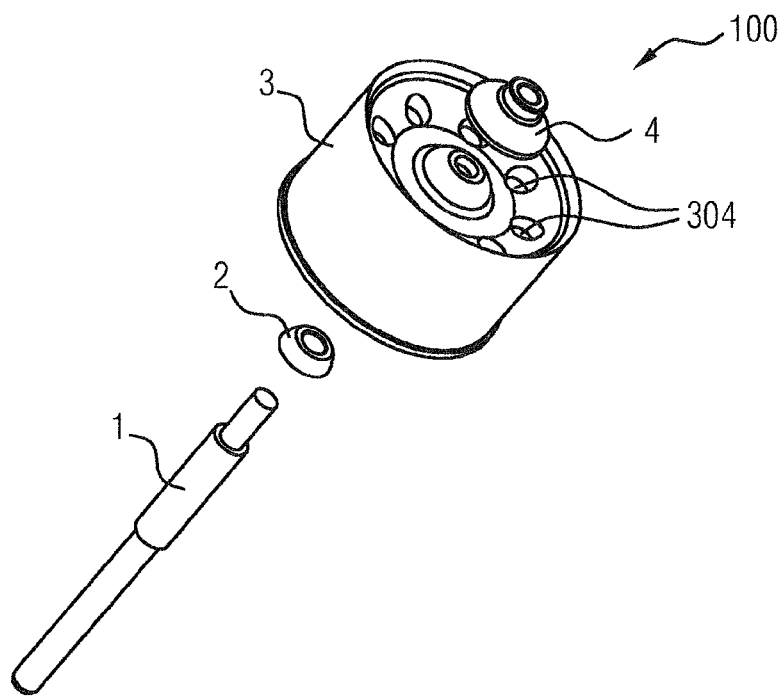
FIG. 1 is a perspective exploded view of a valve core assembly.
Figure 2:
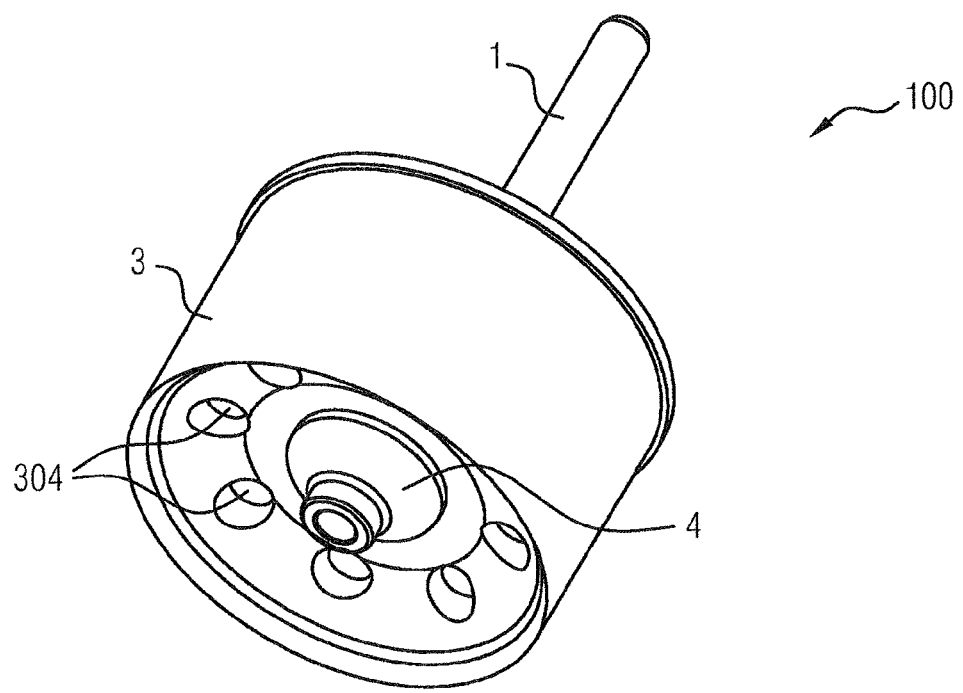
FIG. 2 is a schematic perspective view of the valve core assembly as shown in FIG. 1.

FIG. 1 is a perspective exploded view of a valve core assembly as described in the present utility model, and FIG. 2 is a schematic perspective view of the valve core assembly as shown in FIG. 1. As shown in FIGS. 1 and 2, the valve core assembly 100 of the present device is mainly composed of four components, namely a guide rod 1, a ball bearing 2, a valve head 3 and a fixing block 4.

Figure 3:
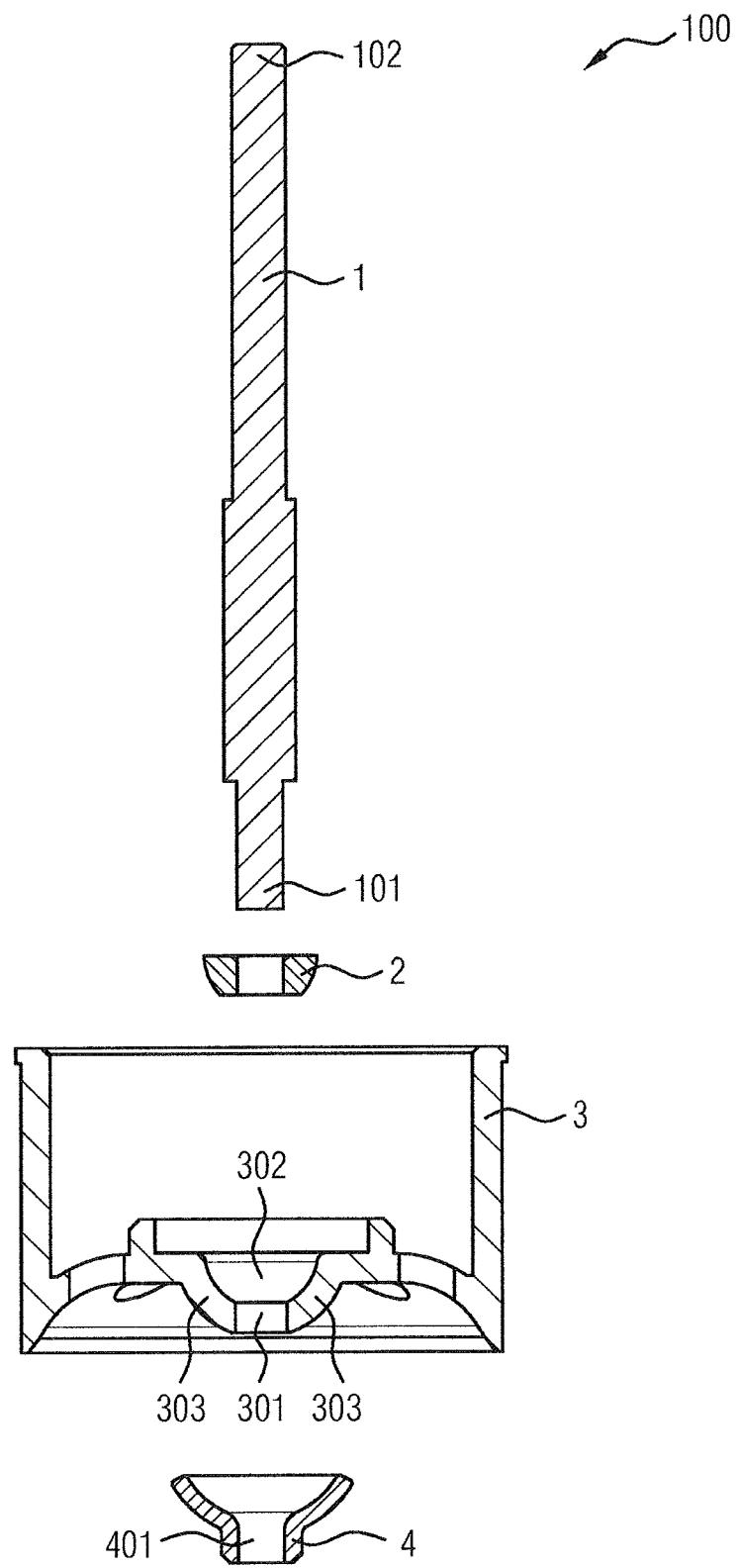
FIG. 3 is an exploded view of the valve core assembly as shown in FIG. 1.
Figure 4:
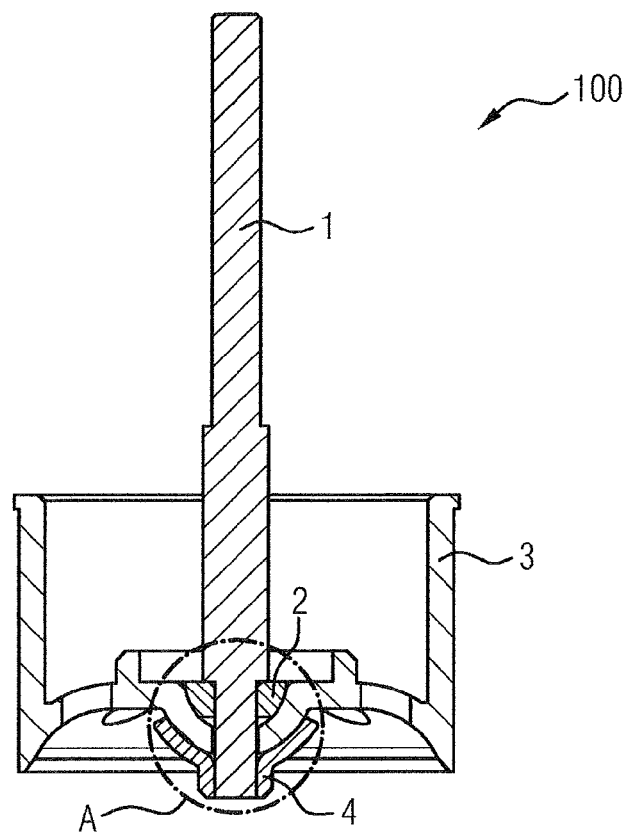
FIG. 4 is a schematic view of the valve core assembly as shown in FIG. 3.
Figure 5:
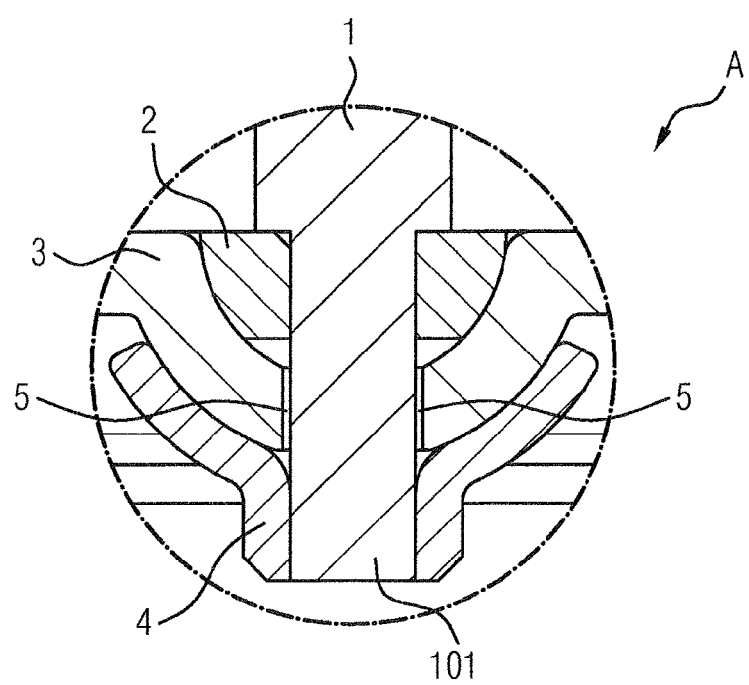
FIG. 5 is an enlarged schematic view of part A as shown in FIG. 4.

FIG. 3 is an exploded plane view of the valve core assembly as shown in FIG. 1, FIG. 4 is a schematic plane view of the valve core assembly as shown in FIG. 3, and FIG. 5 is an enlarged schematic view of part A as shown in FIG. 4. As shown in FIG. 3, the valve head 3 is provided with a first through hole 301 at its bottom. The fixing block 4 is of a hollow bowl-shaped structure, the bowl-shaped structure of the fixing block 4 is provided with a second through hole 401 at its bottom the guide rod has a first end portion 101 and a second end portion 102. The above-mentioned guide rod 1, ball bearing 2, valve head 3 and fixing block 4 are assembled together to form the valve core assembly 100 such that the first end portion 101 of the guide rod 1 is inserted into the ball bearing 2, the first through hole 301 of the valve head 3 and the second through hole 401 of the fixing block 4 in sequence, and the first end portion 101 of the guide rod 1 is fixedly connected to the ball bearing 2 and the second through hole 401 of the fixing block 4 respectively, as shown in detail in FIGS. 2 and 4. In this case, under the action of an external force (e.g., an electromagnetic force), the guide rod 1 can then drive the movement of the valve head 3 clamped between the ball bearing 2 and the fixing block 4.

Preferably, the first end portion 101 of the guide rod 1 is connected to the ball bearing 2 by an interference connection.

Preferably, as shown in FIG. 3, the valve head 3 is provided with a bowl-shaped groove 302 at the bottom, the bowl-shaped groove 302 is in communication with the first through hole 301, the ball bearing 2 is partially or wholly located in the bowl-shaped groove 302. The bowl-shaped groove 302 has an, which outer wall 303 is also partially or wholly located in the hollow bowl-shaped structure of the fixing block 4.

Preferably, as shown in FIGS. 4 and 5, the ball bearing 2 is tightly attached to the valve head 3, without a floating gap therebetween, in an axial direction of the guide rod 1, so that the wear of the valve head 3 can be reduced during the operation of the valve core assembly 100.

Preferably, as shown in FIGS. 4 and 5, the bottom of the valve head 3 is tightly attached to the fixing block 4, without a floating gap therebetween, in the axial direction of the guide rod 1, so that the wear of the valve head 3 can be further reduced during the operation of the valve core assembly 100.

In practical use, the end portion of the valve head 3 is fitted with the valve seat (not shown) provided by the customer to achieve gas-tight sealing; since the customer's valve seat and the valve head 3 themselves have dimensional tolerances, good attachment and sealing between the end portion of the valve head 3 and the customer's valve seat cannot be fully guaranteed. There is a need for a floating valve head to compensate for the poor sealing due to the dimensional tolerances. As shown in FIG. 5, there is an annular floating gap 5 between the first through hole 301 of the valve head 3 and the first end portion 101 of the guide rod 1 in a radial direction of the guide rod 1, the function and effect of the floating gap 5 is for enabling the valve head to have a floating function in the radial direction of the guide rod 1, which can float within a certain angle range in the left and right directions, resulting in a better sealing effect. Meanwhile, axial floating gaps are no longer arranged between the components in the axial direction of the guide rod 1, thereby reducing the wear of the valve head 3 during operation.

Preferably, as shown in FIGS. 4 and 5, the first end portion 101 of the guide rod 1 may be fixedly connected to the second through hole 401 of the fixing block 4 by means of welding or an interference connection.

Further preferably, in order to eliminate the high pressure or vacuum generated by the valve core assembly 100 during the actual operation of the compressed gas bypass valve (not shown in FIGS. 1 to 5), the valve head 3 may have at least one ventilation hole 304, and as shown in FIGS. 1 and 2, the valve head 3 has eight ventilation holes 304.

Figure 6:
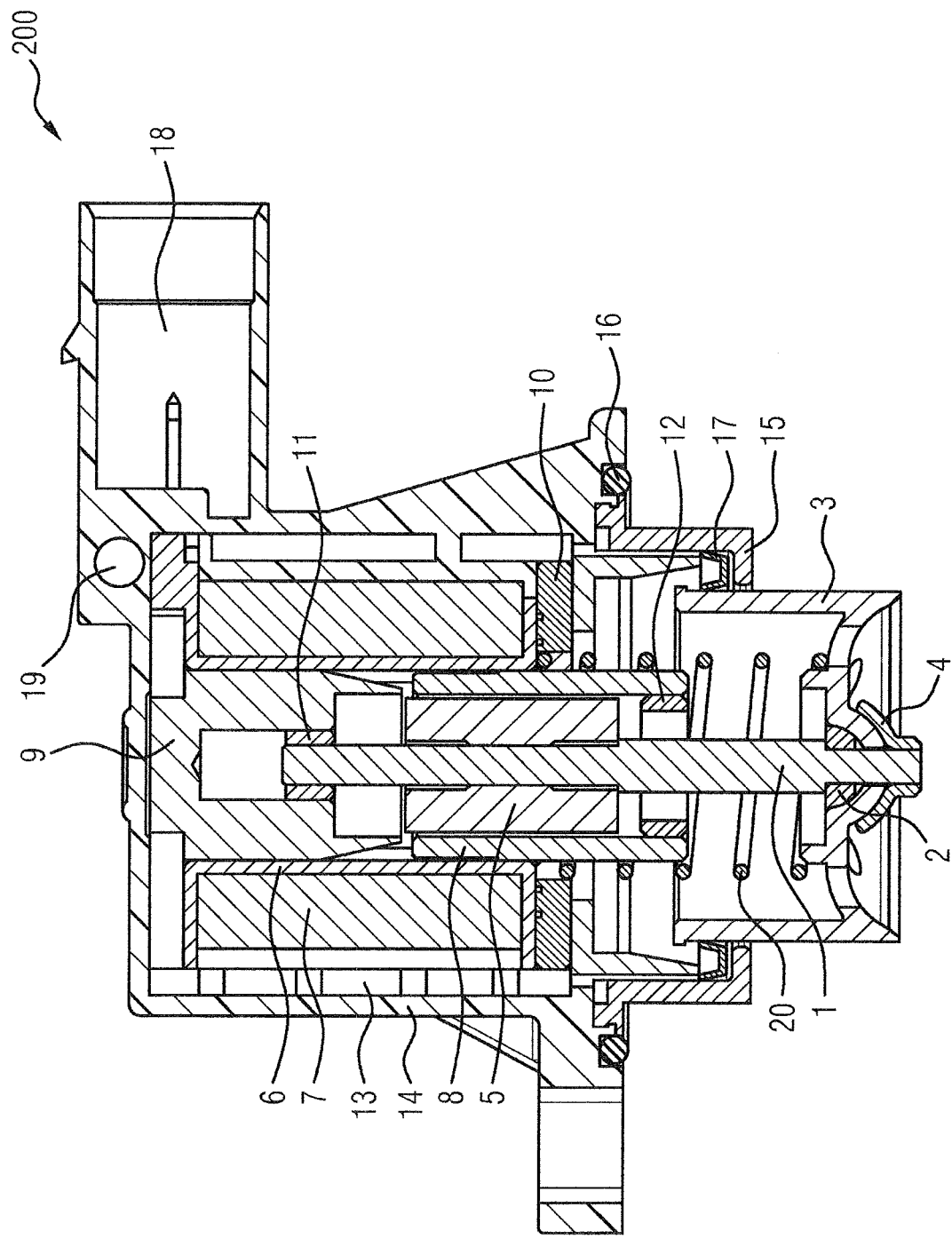
FIG. 6 is a sectional view of a compressed gas bypass valve.

FIG. 6 is a sectional view of a compressed gas bypass valve 200 comprising the valve core assembly 100 shown in FIGS. 1 to 5.

As shown in FIG. 6 and FIGS. 1 to 5, the compressed gas bypass valve 200 comprises a guide rod 1, a ball bearing 2, a valve head 3 and a fixing block 4, wherein the valve head 3 is of a structure which is provided with a first through hole 301 at the bottom, the fixing block 4 is of a hollow bowl-shaped structure, the bowl-shaped structure of the fixing block 4 is provided with a second through hole 401 at the bottom, and said guide rod has a first end portion 101 and a second end portion 102. The above-mentioned guide rod 1, ball bearing 2, valve head 3 and fixing block 4 are assembled together to form the valve core assembly 100 in such a way that the first end portion 101 of the guide rod 1 is inserted into the ball bearing 2, the first through hole 301 of the valve head 3 and the second through hole 401 of the fixing block 4 in sequence, and the first end portion 101 of the guide rod 1 is fixedly connected to the ball bearing 2 and the second through hole 401 of the fixing block 4 respectively, as shown in detail in FIGS. 2 and 4. In this case, under the action of an external force (e.g., an electromagnetic force), the guide rod 1 then can drive the movement of the valve head 3 clamped between the ball bearing 2 and the fixing block 4. Preferably, the first end portion 101 of the guide rod 1 is connected to the ball bearing 2 by an interference connection. Preferably, as shown in FIG. 3, the valve head 3 is provided with a bowl-shaped groove 302 at the bottom, the bowl-shaped groove 302 is in communication with the first through hole 301, the ball bearing 2 is partially or wholly located in the bowl-shaped groove 302, and the bowl-shaped groove 302 has an outer wall 303, which outer wall 303 is also partially or wholly located in the hollow bowl-shaped structure of the fixing block 4. Preferably, as shown in FIGS.

4 and 5, the ball bearing 2 is tightly attached to the valve head 3, without a floating gap therebetween, in an axial direction of the guide rod 1, so that the wear of the valve head 3 can be reduced during the operation of the valve core assembly 100. Preferably, as shown in FIGS. 4 and 5, the bottom of the valve head 3 is tightly attached to the fixing block 4, without a floating gap therebetween, in the axial direction of the guide rod 1, so that the wear of the valve head 3 can be further reduced during the operation of the valve core assembly 100 of the compressed gas bypass valve 200. Furthermore, in practical use, the end portion of the valve head 3 will be fitted with the valve seat (not shown) provided by the customer to achieve gas sealing; since the customer's valve seat and the valve head 3 themselves have dimensional tolerances, good attachment and sealing between the end portion of the valve head 3 and the customer's valve seat cannot be fully guaranteed. There is a need for a floating valve head to compensate for the poor sealing due to the dimensional tolerances. As shown in FIG. 5, there is an annular floating gap 5 between the first through hole 301 of the valve head 3 and the first end portion 101 of the guide rod 1 in a radial direction of the guide rod 1, the function and effect of the floating gap 5 is for enabling said valve head 3 to have a floating function in the radial direction of the guide rod 1, which can float within a certain angle range in the left and right directions, resulting in a better sealing effect; and meanwhile, axial floating gaps are no longer arranged between the components in the axial direction of the guide rod 1, thereby reducing the wear of the valve head 3 during operation.

Preferably, as shown in FIGS. 4 and 5, the first end portion 101 of the guide rod 1 is fixedly connected to the second through hole 401 of the fixing block 4 by welding or an interference connection. Further preferably, in order to eliminate the high pressure or vacuum generated by the valve core assembly 100 during the actual operation of the compressed gas bypass valve (not shown in FIGS. 1 to 5), the valve head 3 may have at least one ventilation hole 304, and as shown in FIGS. 1 and 2, the valve head 3 has eight ventilation holes 304.

The above-mentioned compressed gas bypass valve 200 further comprises:

- an armature 5 connected to the guide rod 1, preferably by an interference connection; a sleeve 8 sheathed onto the outer periphery of the armature 5, the sleeve 8 being made of a magnetically permeable material, which can improve the electromagnetic force performance of the compressed gas bypass valve 200, and it is possible for the armature 5 to be not in contact with the sleeve 8;
- a bobbin 6 at least partially enclosing the sleeve 8, which bobbin 6 may be made by injection moulding;
- a coil 7 arranged to be wound about the bobbin 6;
- two stators, i.e. an upper stator 9 and a lower stator 10, for increasing the magnetic force of the compressed gas bypass valve 200, wherein the upper stator 9 is provided above the armature 5, the lower stator 10 is annular and is arranged to surround the sleeve 8, and both the upper stator 9 and the lower stator 10 are made of a magnetically permeable material;
- an upper bearing 11 and a lower bearing 12 for guiding the guide rod 1, the guide rod 1 moving between the upper bearing 11 and the lower bearing 12, wherein such a configuration has a better wear resistance, and due to the guidance of the guide rod 1 by the bearings, the guidance in movements of the valve head 3 and the armature 5 is achieved without using, for example, the sleeve to guide the armature 5 directly, such that there is no need to specially treat the surface of the armature 5, reducing the requirements of the surface quality of the armature, and in turn reducing the processing costs of the armature; and
- an elastic component 20 for biasing the valve head 3, wherein the elastic member 20 may be a compression spring or a biasing spring which is partially wound outside the sleeve 8 and is partially located inside the valve head 3.

Preferably, in order to fix the upper bearing 11 and the lower bearing 12, the upper stator 9 is in an interference connection with the upper bearing 11, and the lower stator 10 is in an interference connection with the sleeve 8.

Preferably, the upper bearing 11 and the lower bearing 12 are respectively located on two sides of the armature 5, and the second end portion 102 of the guide rod is located in the upper bearing 11; furthermore, in order to fix the upper bearing 11 and the lower bearing 12, the upper bearing 11 is in an interference connection with the upper stator 9, and the lower stator 12 is in an interference connection with the sleeve 8.

Preferably, the compressed gas bypass valve 200 further comprises a shell 13 surrounding the coil 7, an outer package member 14 enclosing the shell 13, and a protective shield 15 surrounding the valve head 3, wherein the shell 13 is made of a magnetically permeable material to increase the magnetic force, and the shell 13 and the coil 7 together constitute a fully enclosed coil structure. The compressed gas bypass valve 200 further comprises a seal ring 16 which is located between the outer package member 14 and the protective shield 15, and a seal ring 17 which is located between the protective shield 15 and the valve head 3, wherein the seal ring 16 may be an O-shaped ring, and the seal ring 17 may be a V-shaped ring.

Preferably, the compressed gas bypass valve 200 further comprises a plug connector 18 for providing an electrical connection, which is used to power the compressed gas bypass valve 200.

Preferably, the compressed gas bypass valve 200 further comprises an electronic component 19 for absorbing pulse energy, such that the provision of the electronic component 19 can protect the body of the compressed gas bypass valve 200 from sudden changes in external voltage such as pulses and therefore being damaged. In addition, the electronic component 19 can absorb the energy generated by the valve body, thereby protecting against damage to a customer's power supply terminal. Such an electronic component for absorbing pulse energy may be selected from numerous electronic components known to those skilled in the art, such as a diode, and therefore allows the compressed gas bypass valve 200 to meet the diversity in the market, thereby being applicable to different customer requirements.

Operation modes for opening and closing the compressed gas bypass valve 200 according to the present device are as follows: when the compressed gas bypass valve 200 is de-energized, the valve head 3 of the bypass valve 200 is pressed downwardly against a customer's valve seat (not shown) under the action of gravity and the elastic component 20, so that the gas passage is closed. When the compressed gas bypass valve 200 is energized, a magnetic circuit is formed by the upper stator 9, the lower stator 10, and the armature 5; under the action of the electromagnetic force generated by the coil 7, the guide rod 1 is driven upwardly by the armature 5; and then the valve head 3 is driven upwardly by the guide rod 1, so as to open the compressed gas bypass valve 200, so that the gas passage is opened.

While the present device has been disclosed above by means of the relatively preferred embodiments, the present device is not limited thereto. A variety of changes and modifications made by a person skilled in the art, without departing from the spirit and scope of the present utility model, should be encompassed in the scope of protection of the present utility model, and thus the scope of protection of the present device should be defined by the claims.

The invention claimed is:

1. A valve core assembly, comprising:
  a guide rod having a first end portion;
  a ball bearing;
  a valve head having a bottom wall and a first through hole arranged in the bottom wall; and
  a fixing block, configured as a hollow bowl-shaped structure having a second through hole;
  wherein the first end portion of the guide rod is inserted in order:
    first into the ball bearing,
    second into the first through hole of the valve head, and
    third into the second through hole of the fixing block, and
  wherein the first end portion of the guide rod is fixedly connected to the ball bearing and the second through hole of the fixing block,
  wherein the valve head is longitudinally clamped directly between the ball bearing and the fixing block, and
  wherein the ball bearing is always in direct contact with the valve head in an axial direction of the guide rod.

2. The valve core assembly as claimed in claim 1, wherein the first end portion of the guide rod is connected to the ball bearing by an interference connection.

3. The valve core assembly as claimed in claim 1, wherein the valve head is provided with a bowl-shaped groove at the bottom wall, the bowl-shaped groove is in communication with the first through hole, and the ball bearing is at least partially located in the bowl-shaped groove.

4. The valve core assembly as claimed in claim 3, wherein the bowl-shaped groove has an outer wall that is at least partially arranged in the hollow bowl-shaped structure of the fixing block.

5. The valve core assembly as claimed in claim 1, wherein the ball bearing is attached to the valve head substantially without a floating gap therebetween, in the axial direction of the guide rod.

6. The valve core assembly as claimed in claim 1, wherein the bottom wall of the valve head is attached to the fixing block, substantially without a floating gap therebetween, in the axial direction of the guide rod.

7. The valve core assembly as claimed in claim 1, wherein an annular floating gap is defined between the first through hole of the valve head and the first end portion of the guide rod in a radial direction of the guide rod.

8. The valve core assembly as claimed in claim 1, wherein the first end portion of the guide rod is fixedly connected to the second through hole of the fixing block by one of welding and an interference connection.

9. The valve core assembly as claimed in claim 1, wherein the valve head is provided with at least one ventilation hole.

10. A compressed gas bypass valve, comprises:
  a valve core assembly comprising:
    a guide rod having a first end portion;
    a ball bearing;
    a valve head having a bottom wall and a first through hole arranged in the bottom wall; and
    a fixing block, configured as a hollow bowl-shaped structure having a second through hole;
    wherein the first end portion of the guide rod is inserted in order:
      first into the ball bearing,
      second into the first through hole of the valve head, and
      third into the second through hole of the fixing block, and
    wherein the first end portion of the guide rod is fixedly connected to the ball bearing and the second through hole of the fixing block,
  an armature connected to the guide rod;
  a sleeve sheathed onto an outer periphery of the armature;
  a bobbin at least partially enclosing the sleeve;
  a coil arranged around the bobbin;
  an upper stator;
  a lower stator;
  an upper bearing;
  a lower bearing configured to guide the guide rod;
  an elastic component configured to bias the valve head; and
  an electronic component configured to absorb pulse energy.

11. The compressed gas bypass valve as claimed in claim 10, wherein the armature has an interference connection with the guide rod.

12. The compressed gas bypass valve as claimed in claim 10, wherein the upper stator has an interference connection with the upper bearing, and the lower stator has an interference connection with the sleeve.

13. The compressed gas bypass valve as claimed in claim 10,
  wherein the upper bearing and the lower bearing are respectively located on two opposite sides of the armature,
  wherein a second end portion of the guide rod is located in the upper bearing,
  wherein the upper bearing has an interference connection with the upper stator, and
  wherein the lower stator is in an interference connection with the sleeve.

14. The compressed gas bypass valve as claimed in claim 10, wherein the elastic component is a compression spring that is partially wound outside the sleeve and is partially located inside the valve head.

15. The compressed gas bypass valve as claimed in claim 10, further comprising:
  a shell surrounding the coil; and
  an outer package member enclosing the shell.

16. The compressed gas bypass valve as claimed in claim 15, further comprising:
  a protective shield surrounding the valve head.

17. The compressed gas bypass valve as claimed in claim 16, further comprising:
  a seal ring located between the outer package member and the protective shield.

18. The compressed gas bypass valve as claimed in claim 16, further comprising:
  a seal ring located between the protective shield and the valve head.

19. The compressed gas bypass valve as claimed in claim 10, further comprising:
  a plug connector configured to provide an electrical connection.

* * * * *